US012698367B2

(12) United States Patent
Luo et al.

(10) Patent No.: US 12,698,367 B2
(45) Date of Patent: Aug. 4, 2026

(54) SHAPE THIN SUBSTRATES BY CURING SHRINKABLE MATERIALS DEPOSITED WITH LOCALIZED VARIATIONS

(71) Applicant: Applied Materials, Inc., Santa Clara, CA (US)

(72) Inventors: Yingdong Luo, Newark, CA (US); Xiaopei Deng, San Jose, CA (US); Kang Luo, San Jose, CA (US); Rami Hourani, Santa Clara, CA (US); Daihua Zhang, Los Altos, CA (US); Ludovic Godet, Sunnyvale, CA (US)

(73) Assignee: Applied Materials, Inc., Santa Clara, CA (US)

( * ) Notice: Subject to any disclaimer, the term of this patent is extended or adjusted under 35 U.S.C. 154(b) by 789 days.

(21) Appl. No.: 18/084,741

(22) Filed: Dec. 20, 2022

(65) Prior Publication Data

US 2023/0192971 A1     Jun. 22, 2023

Related U.S. Application Data

(60) Provisional application No. 63/265,919, filed on Dec. 22, 2021.

(51) Int. Cl.
B05D 1/00          (2006.01)
B41M 5/00          (2006.01)
(Continued)

(52) U.S. Cl.
CPC .............. C08J 3/28 (2013.01); B41M 5/0047 (2013.01); B41M 5/0064 (2013.01); C08J 5/18 (2013.01); C08J 2333/10 (2013.01)

(58) Field of Classification Search
CPC ....................................................... B05D 1/00
See application file for complete search history.

(56) References Cited

U.S. PATENT DOCUMENTS

2009/0016785 A1*    1/2009    Haan ........................ B41J 11/46
                                                                      399/301
2009/0053454 A1      2/2009    Chiu et al.
(Continued)

FOREIGN PATENT DOCUMENTS

CN          101553366 A     10/2009
CN          111196094 A      5/2020
(Continued)

OTHER PUBLICATIONS

International Search Report and Written Opinion PCT-US2022-053462 dated May 1, 2023.
(Continued)

*Primary Examiner* — Gordon Baldwin
*Assistant Examiner* — Mohammad Mayy
(74) *Attorney, Agent, or Firm* — Patterson + Sheridan, LLP

(57)          ABSTRACT

Methods of curing a deformation in a substrate are provided. In some embodiments, the method includes identifying one or more areas on the substrate with deformation. The method further includes printing a first film on a first area of a surface of the substrate via inkjet printing, the first film being a material that polymerizes and contracts when cured. The method includes printing a second film on a second area of the surface of the substrate via inkjet printing, the second film being a material that polymerizes and contracts when cured. The method further includes curing the first film and the second film to induce a bend in the substrate. In some embodiments, the method includes inkjet printing a third film and a fourth film on the surface of the substrate.

25 Claims, 9 Drawing Sheets

(51) Int. Cl.
    *C08J 3/28*           (2006.01)
    *C08J 5/18*           (2006.01)

(56)           References Cited

U.S. PATENT DOCUMENTS

2010/0066791 A1 *    3/2010    Jeremic ............. B41J 11/00214
                                                   347/102
2019/0141841 A1       5/2019    Chamberlin et al.

FOREIGN PATENT DOCUMENTS

| CN | 112955321 A | 6/2021 |
| JP | 2009-167384 A | 3/2001 |
| JP | 2001060604 A | 3/2001 |

OTHER PUBLICATIONS

Taiwanese Office Action for Application No. 111149181 dated May 14, 2026.

* cited by examiner

SHAPE THIN SUBSTRATES BY CURING SHRINKABLE MATERIALS DEPOSITED WITH LOCALIZED VARIATIONS

CROSS-REFERENCE TO RELATED APPLICATIONS

This application claims benefit of U.S. Provisional Patent Application No. 63/265,919, filed Dec. 22, 2021, which is herein incorporated by reference.

BACKGROUND

Field

Embodiments of the present disclosure generally relate to apparatus and methods for correcting substrate deformation, such as the deformation of optical devices or other substrates.

Description of the Related Art

Optical performance of an optical device is affected by defects present within the optical device. Defects may include, for example, bowing and warping of the optical device. Conventional attempts to correct bow include planarization/polishing of the optical device, or deposition of a thin material by chemical vapor deposition (CVD) or physical vapor deposition (PVD). However, conventional methodologies are expensive and/or do not allow for localized corrections.

Therefore, there is a need for improved methods and apparatuses for correcting bowing and warping of optical devices and other substrates.

SUMMARY

Embodiments of the present disclosure generally relate to apparatus and methods for correcting substrate deformation, such as the deformation of optical devices or other substrates.

In at least one aspect, a method of curing a deformation in a substrate is provided. The method includes identifying one or more areas on the substrate with deformation. The method further includes printing a first film on a first area of a surface of the substrate via inkjet printing, the first film being a material that polymerizes and contracts when cured. The method includes printing a second film on a second area of the surface of the substrate via inkjet printing, the second film being a material that polymerizes and contracts when cured. The method further includes curing the first film and the second film to induce a bend in the substrate.

In another aspect, a method of curing a deformation in a substrate is provided. The method includes identifying one or more areas on the substrate with deformation. The method further includes printing a first film on a first area of a surface of the substrate via inkjet printing, the first film being a material that polymerizes and contracts when cured. The method further includes printing a second film on a second area of the surface of the substrate via inkjet printing, the second film being a material that polymerizes and contracts when cured. The method includes printing a third film on a third area of the surface of the substrate via inkjet printing, the third film being a material that polymerizes and contracts when cured. The method further includes printing a fourth film on a fourth area of the surface of the substrate via inkjet printing, the fourth film being a material that polymerizes and contracts when cured. The method further includes curing of the first film, the second film, the third film, and the fourth film to induce a bend in the substrate.

In yet another aspect, a method of curing a deformation in a substrate is provided. The method includes identifying one or more areas on the substrate with deformation. The method further includes printing a first film on a first area of a surface of the substrate via inkjet printing, the first film being a material that polymerizes and contracts when cured. The method includes printing a second film on a second area of the surface of the substrate via inkjet printing, the second film being a material that polymerizes and contracts when cured. The method further includes printing a third film on a third area of the surface of the substrate via inkjet printing, the third film being a material that polymerizes and contracts when cured. The method includes printing a fourth film on a fourth area of the surface of the substrate via an inkjet printer, the fourth film being a material that polymerizes and contracts when cured. The method further includes curing the first film, the second film, the third film, and the fourth film to induce a bend in the substrate.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of scope, as the disclosure may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
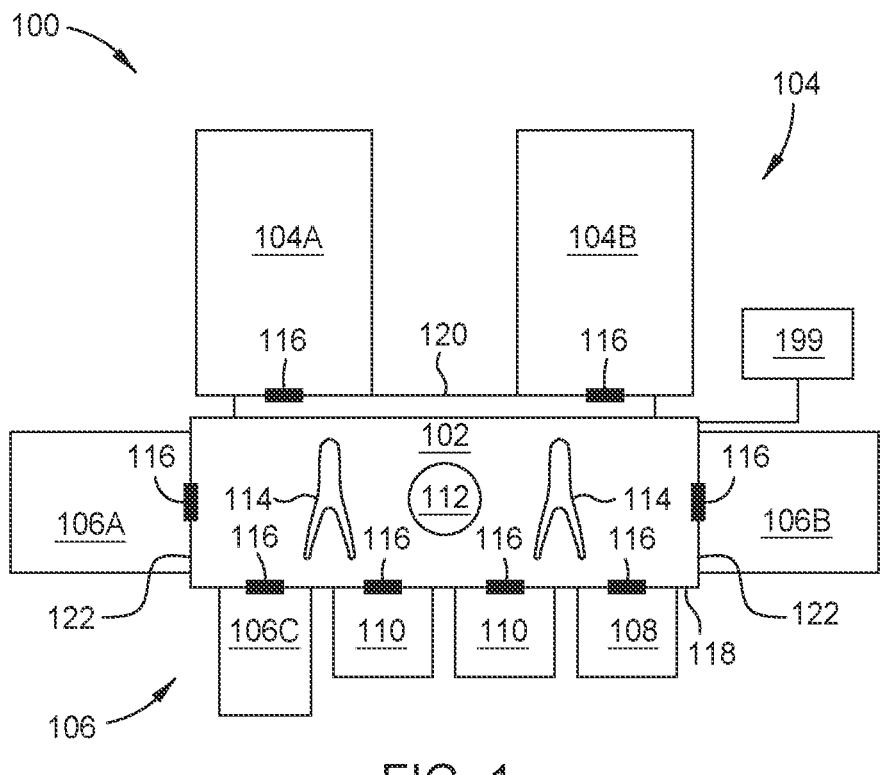
FIG. 1 is a schematic view of an inkjet printing platform according to embodiments.

FIG. 1 is a schematic view of an inkjet printing platform 100. The inkjet printing platform 100 includes a transfer chamber 102, one or more inkjet chambers 104, a plurality of auxiliary modules 106, a substrate flipper 108, and load ports 110. The transfer chamber 102 includes a pre-aligner 112 and two transfer robots 114 disposed therein. The transfer robots 114 are operable to transfer one or more substrates from the load ports 110 and between the plurality of auxiliary modules 106A, 106B, the substrate flipper 108, the pre-aligner 112, and the inkjet chambers 104A, 104B.

The inkjet printing platform 100 is operable to process a substrate to form a film and/or an optical device. In one embodiment, which can be combined with other embodiments described herein, the substrate is an optical device substrate. The processing of the substrate may include an inkjet printing process. The substrate is any suitable substrate on which an optical device or optical device film may be formed. In one embodiment, the substrate includes, but is not limited to, silicon (Si), silicon nitride (SiN), silicon dioxide (SiO$_2$), fused silica, quartz, silicon carbide (SiC), germanium (Ge), silicon germanium (SiGe), indium phosphide (InP), gallium arsenide (GaAs), gallium oxide (GaO), diamond, lithium niobate (LiNbO$_3$), gallium nitride (GaN), sapphire, tantalum oxide (Ta$_2$O$_5$), titanium dioxide (TiO$_2$), or combinations thereof. The substrate may have a diameter in a range from about 100 mm to about 750 mm, although other sizes are contemplated. In one example, the substrate has a surface area of about 1,000 cm$^2$ or more. In another example, the surface area of the substrates may be about 2,000 cm$^2$ or more, and about 4,000 cm$^2$ or more.

The inkjet printing process performed in the inkjet printing platform 100 assists in the fabrication of at least one optical device or an optical film. It is to be understood that the at least one optical device described herein is an exemplary optical device and other optical devices may be used with or modified to accomplish aspects of the present disclosure. In one embodiment, which can be combined with other embodiments described herein, the optical device is a waveguide combiner. The waveguide combiner may be utilized for virtual, augmented, or mixed reality. In another embodiment, which can be combined with other embodiments described herein, the optical device is a micro-lens array. In another embodiment, which can be combined with other embodiments described herein, the optical device is utilized for prescription glasses. In yet another embodiment, which can be combined with other embodiments described herein, the optical device is a flat optical device, such as a metasurface. It is to be noted that aspects of the disclosure are applicable to substrates which are not optical devices, as well.

Prior to processing, the substrates are removed from the at least one load port 110 by one of the transfer robots 114 and transferred to the transfer chamber 102. The load ports 110 are formed in a first portion 118 of the transfer chamber 102. Upon completion of substrate processing in the inkjet printing platform 100, the processed substrates may be returned to their respective load ports 110. The load ports 110 are configured to automatically load and unload the substrates. The substrate can be accessed by the transfer robots 114 through a slit valve 116 formed between the load ports 110 and the transfer chamber 102. The transfer robots 114 are configured to handle edges of a backside surface of the substrate to avoid backside surface contamination.

Prior to processing, the transfer robot 114 places the substrate on the pre-aligner 112. The pre-aligner 112 may be positioned in the transfer chamber 102. The pre-aligner 112 is operable to at least one of read an identification of a substrate or detect an orientation of the substrate. The pre-aligner 112 is configured to align the substrate in a desired rotational orientation within the inkjet printing platform 100 based on the identification and the orientation of the substrate. In some embodiments, which can be combined with other embodiments described herein, the pre-aligner 112 may include a heat source, such as lamps or infrared generating radiant heaters, adapted to heat the substrate to a desired temperature. The pre-aligner 112 can further be pressurized under a vacuum condition to ensure that any undesirable water or other contamination is removed from the surface of the substrate prior to processing.

The transfer robots 114 are operable to position the substrate in one of a plurality of auxiliary modules 106A, 106B, 106C. For example, as shown in FIG. 1, the inkjet printing platform 100 includes the first auxiliary module 106A, the second auxiliary module 106B, and the third auxiliary module 106C. The plurality of auxiliary modules 106A, 106B, 106C are coupled to at least one of side portions 122, the first portion 118 or a second portion 120 of the transfer chamber 102. For example, as shown in FIG. 1, the first auxiliary module 106A is coupled to the side portion 122, the second auxiliary module 106B is coupled to the first portion 118, and the third auxiliary module 106C is coupled to the first portion 118.

The plurality of auxiliary modules 106A, 106B, 106C are coupled to the transfer chamber 102 via a plurality of slit valves 116. The transfer robots 114 place the substrates into the auxiliary modules 106A-106C via the slit valves 116. The plurality of auxiliary modules 106 can be selectively isolated from the transfer chamber 102 by use of the slit valves 116 that are disposed between each of the plurality of auxiliary modules 106 and the transfer chamber 102. The first auxiliary module 106A is at least one of a plasma module, lithography module, baking module, chilling module, ultraviolet (UV) curing module, or metrology module. The second auxiliary module 106B is at least one of a plasma module, lithography module, baking module, chilling module, ultraviolet (UV) curing module, or metrology module. The third auxiliary module 106C is at least one of a plasma module, lithography module, baking module, chilling module, ultraviolet (UV) curing module, or metrology module.

The substrate may be transferred to one of the plurality of auxiliary modules 106A, 106B, 106C prior to the inkjet printing process or after the inkjet printing process performed in the inkjet chambers 104. In one example, one or more of the auxiliary modules 106A, 106B, 106C is a metrology module configured to determine the topology of planarity of substrate. For example, the metrology module can determine locations of curvature and/or warpage on a substrate, to a scale within nanometers. Although the three auxiliary modules 106A-106C are shown in FIG. 1, the inkjet printing platform 100 is not limited in the number of auxiliary modules included. For example, one or more auxiliary modules 106 may be coupled to the transfer chamber 102.

The transfer robots 114 are further operable to position the substrate in one of the inkjet chambers 104A, 104B. For example, as shown in FIG. 1, the inkjet printing platform 100 includes the first inkjet chamber 104A and the second inkjet chamber 104B. The inkjet chambers 104 may be coupled to the second portion 120 of the transfer chamber 102 opposing the third auxiliary module 106C, the load ports 110, and the substrate flipper 108. The inkjet chambers 104 are operable to perform an inkjet printing process on the substrate. The inkjet printing process enables selective coating of the substrate with an inkjet material to facilitate correction deformation and/or non-planarity determined by a metrology module.

The first inkjet chamber 104A and the second inkjet chamber 104B are coupled to the transfer chamber 102 via a plurality of slit valves 116. The transfer robots 114 place the substrates into the first inkjet chamber 104A and the second inkjet chamber 104B through the slit valves 116. The plurality of slit valves 116 provide an opening for a portion of the transfer robot 114 to enter into the inkjet chambers 104 to place the substrate on a stage (shown in FIG. 3). The first inkjet chamber 104A and the second inkjet chamber 104B can be selectively isolated from the transfer chamber 102 by use of the slit valves 116 that are disposed between each of the first inkjet chamber 104A and the transfer chamber 102, as well as the second inkjet chamber 104B and the transfer chamber 102. The first inkjet chamber 104A and the second inkjet chamber 104B can further be pressurized under a vacuum condition when the slit valve 116 is closed to ensure that any undesirable water or other contamination is removed from the surface of the substrate during the inkjet printing process. Each of the first inkjet chamber 104A and the second inkjet chamber 104B may be different than the other inkjet chamber. For example, the first inkjet chamber 104A may be configured to deposit a different inkjet material than the second inkjet chamber 104B. Although two inkjet chambers 104 are shown in FIG. 1, the inkjet printing platform 100 is not limited in the number of inkjet chambers 104. For example, one or more inkjet chambers 104 may be coupled to the transfer chamber 102.

After the inkjet printing process is performed in the at least one inkjet chamber 104, the transfer robots 114 are operable to optionally position the substrate in the substrate flipper 108. The substrate flipper 108 may be coupled to the first portion 118 of the transfer chamber 102. The substrate flipper 108 is coupled to the transfer chamber 102 via a slit valve 116. The substrate flipper 108 flips the substrate such that a backside surface of the substrate is facing upwards. The substrate may be removed from the substrate flipper 108 and positioned in one of the plurality of auxiliary modules 106 and/or one of the inkjet chambers 104 and/or in a UV cure module. The substrate flipper 108 allows for double-side processing of the substrate. The capability of double-side processing expands the design space and functionality of the substrate.

The inkjet printing platform 100 also includes a controller 199. The controller 199 includes a programmable central processing unit (CPU) that is operable with a memory and a mass storage device, an input control unit, and a display unit (not shown), such as power supplies, clocks, cache, input/output (I/O) circuits, and the like, coupled to the various components of the inkjet printing platform 100 to facilitate control of substrate processing.

Figure 2:
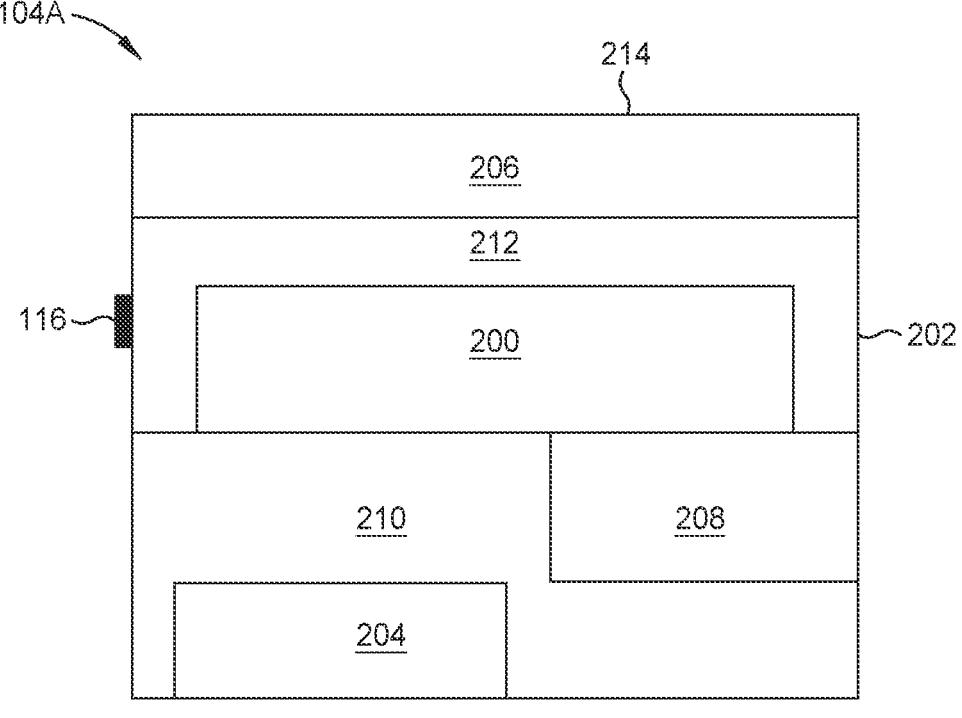
FIG. 2 is a schematic, side-view of an inkjet chamber according to embodiments.

FIG. 2 is a schematic, side-view of an inkjet chamber 104A. It is noted that inkjet chamber 104A is similar to the inkjet chamber 104B. The inkjet chamber 104 is included in the inkjet printing platform 100. The inkjet chamber 104A includes an enclosure 202. The enclosure 202 encloses an inkjet printer 200, a fluid supply manifold 204, a fan filter unit 206, and an exhaust port 208 within the inkjet chamber 104. The inkjet printer 200 and the fan filter unit 206 are disposed in a processing region 212 of the inkjet chamber. An inkjet printing process is performed with the inkjet printer 200 within the processing region 212. The exhaust port 208 and the fluid supply manifold 204 are disposed in a lower region 210 of the inkjet chamber 104. The lower region 210 is disposed below the processing region 212. The enclosure 202 includes a slit valve 116 therethrough such that a transfer robot 114 (shown in FIG. 1) may position the substrate in the processing region 212.

The fluid supply manifold 204 is disposed in the lower region 210. The fluid supply manifold 204 may include a plurality of supply fluids. For example, the fluid supply manifold 204 may include maintenance fluids utilized for maintenance of the inkjet chamber 104. The fluid supply manifold 204 may also include material sources, such as inkjet materials, utilized in the inkjet printing process. The fluid supply manifold 204 may be fluidly coupled to the inkjet printer 200. In one example, the inkjet materials provided by the supply manifold include one or more of sol-gel, an acrylate, or a primer.

The exhaust port 208 is disposed in the lower region 210. The exhaust port 208 is fluidly coupled to the processing region 212. The exhaust port 208 is operable to remove contaminants from the processing region 212 produced during processing. In one embodiment, which can be combined with other embodiments described herein, contaminants such as volatile organic compounds (VOCs) generated by the inkjet material or maintenance materials are removed via the exhaust port 208. The processing region 212 is maintained at a negative pressure to avoid the contaminants leaking outside of the inkjet chamber 104.

The fan filter unit 206 is disposed in the processing region 212. The fan filter unit 206 is coupled to a top surface 214 of the enclosure 202. The fan filter unit 206 is operable to create a vertical flow of clean, dry air through the processing region 212. The fan filter unit 206 maintains the processing region 212 at a positive pressure to minimize air and particle intake from outside the inkjet chamber 104. The fan filter unit 206 and the exhaust port 208 provide independent pressure control in the processing region 212. The fan filter unit 206 and the exhaust port 208 provide for control of the processing region 212. The control of the processing region 212 ensures process quality and consistency when processing the substrates.

Figure 3:
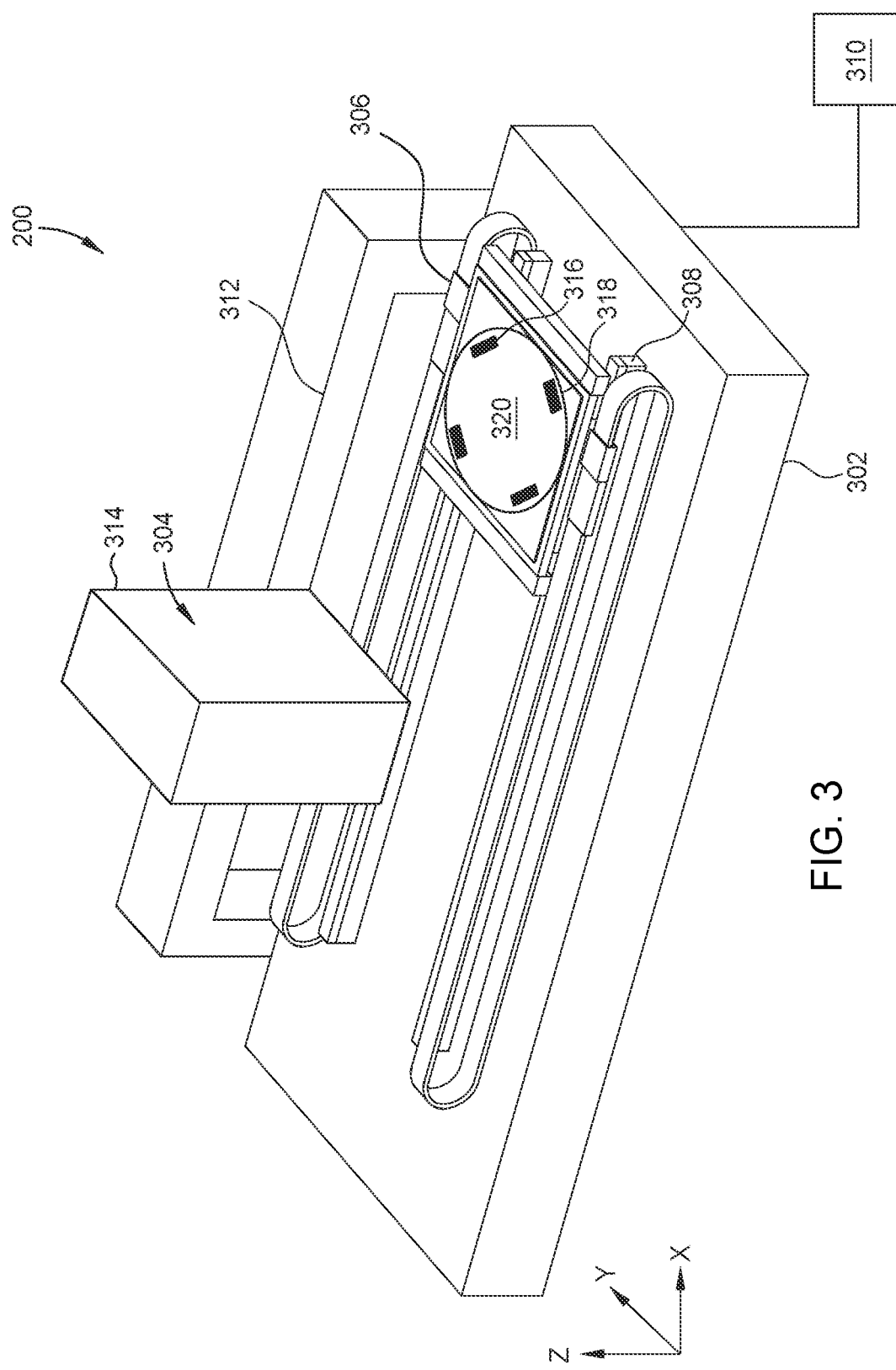
FIG. 3 is a perspective view of an inkjet printer according to embodiments.

FIG. 3 is a perspective view of an inkjet printer 200. The inkjet printer 200 is disposed in a processing region 212 (shown in FIG. 2) of an inkjet chamber 104A (shown in FIG. 2). The inkjet printer 200 includes a stage 306 and a processing apparatus 304. The stage 306 is supported by a pair of tracks 308 disposed on a slab 302. A substrate 320 is supported by the stage 306. The stage 306 moves along the pair of tracks 308 in at least one of an X direction, a Y direction, or a Z direction, as indicated by the coordinate system shown in FIG. 3. In one embodiment, the pair of tracks 308 is a pair of parallel magnetic channels. As shown, each track 308 of the pair of tracks 308 is linear. In other embodiments, the pair of tracks 308 may have a non-linear shape. In one embodiment, which can be combined with other embodiments described herein, an encoder is coupled to the stage 306 in order to provide information of the location of the stage 306 to a controller 310. The controller 310 is generally designed to facilitate the control and automation of the inkjet printing process described herein. The controller 310 may be coupled to or in communication with the processing apparatus 304, the stage 306, and the encoder.

The processing apparatus 304 is coupled to a support 312. The processing apparatus 304 is disposed over the pair of tracks 308. The pair of tracks 308 and the stage 306 are operable to pass under the processing apparatus 304. The processing apparatus 304 is supported over the slab 302 by the support 312. The processing apparatus 304 includes a case 314. The processing apparatus 304 is operable to distribute one or more inkjet materials onto the substrate 320. The substrate 320 is positioned on the stage 306 via one of the transfer robots 114 (shown in FIG. 1). The stage 306 may include vacuum slots 316 to retain the substrate 320. The vacuum slots 316 are between 1 millimeter and 5 millimeters from an edge 318 of the substrate 320. In one embodiment, which can be combined with other embodiments described herein, the vacuum slots 316 are elevated from the surface of the stage 306. The vacuum slots 316 retain the substrate 320 while minimizing contact to a backside surface of the substrate 320 and contamination of the substrate 320.

Figure 4:
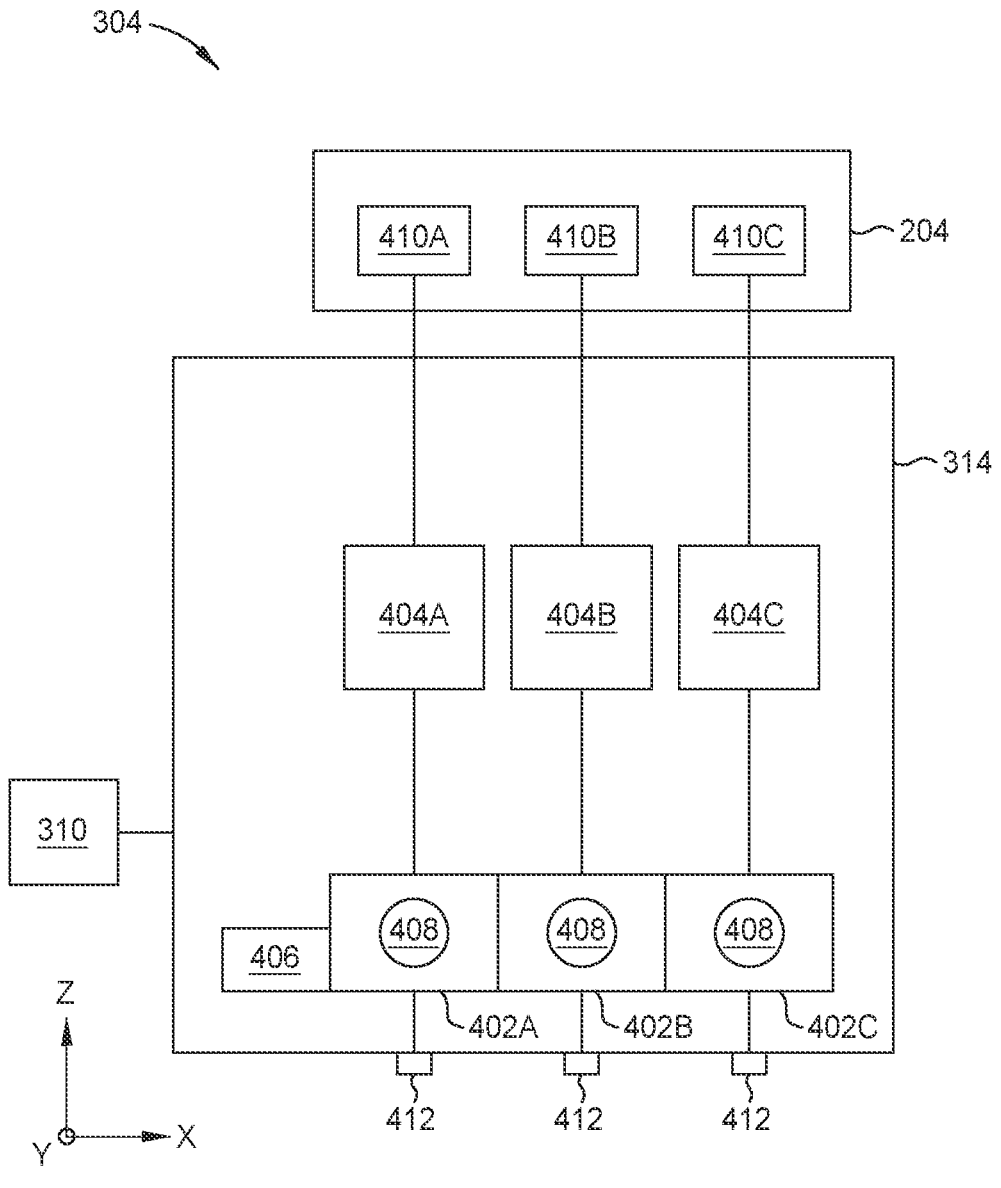
FIG. 4 is a schematic, side-view of a processing apparatus according to embodiments.

FIG. 4 is a schematic, side-view of a processing apparatus 304. The processing apparatus 304 may be disposed in an inkjet printer 200 (shown in FIG. 2). The processing apparatus 304 is operable to distribute one or more inkjet materials onto the substrate 320 (shown in FIG. 3). The processing apparatus 304 includes a plurality of printheads 402A-402C, a plurality of ink recirculation modules 404A-404C, at least one alignment camera 406, and a plurality of alignment mechanisms 408. The plurality of printheads 402A-402C, the plurality of ink recirculation modules 404A-404C, the at least one alignment camera 406, and the plurality of alignment mechanisms 408 are disposed in a case 314 of the processing apparatus 304.

The processing apparatus 304 may include one or more printheads 402A-402C. For example, as shown in FIG. 4, the processing apparatus 304 includes a first printhead 402A, a second printhead 402B, and a third printhead 402C. Although only three of the plurality of printheads 402A-402C are shown in FIG. 4, the processing apparatus 304 is not limited in the number of printheads 402A-402C included in the case 314. For example, one or more printheads 402A-402C may be included in the case 314. In one embodiment, which can be combined with other embodiments described herein, a first inkjet chamber 104A (shown in FIG. 1) includes three printheads 402A-402C and a second inkjet chamber 104B (shown in FIG. 1) includes four printheads. In another embodiment, which can be combined with other embodiments described herein, the first inkjet chamber 104A (shown in FIG. 1) and the second inkjet chamber 104B (shown in FIG. 1) include the same number of printheads 402A-402C in the processing apparatus 304.

A fluid supply manifold 204 disposed in the inkjet chamber 104 includes one or more inkjet material sources 410A-410C. Each inkjet material source 410A-410C is fluidly coupled to one of the plurality of printheads 402A-402C. For example, a first inkjet material source 410A is coupled to the first printhead 402A, a second inkjet material source 410B is coupled to the second printhead 402B, and a third inkjet material source 410C is coupled to the third printhead 402C. In one embodiment, which can be combined with other embodiments described herein, each inkjet material source 410A-410C may be loaded with different inkjet materials. In another embodiment, which can be combined with other embodiments described herein, the same inkjet material may be loaded into at least two inkjet material sources 410A-410C. Including the same inkjet material in multiple inkjet material sources 410A-410C improves throughput and the print resolution of the inkjet printing process. Including multiple inkjet materials in each inkjet chamber 104 increases the array of inkjet materials that may be deposited in the inkjet process.

Each of the plurality of printheads 402A-402C are coupled to one of the alignment mechanisms 408. The alignment mechanisms 408 align each of the plurality of printheads 402A-402C to each other. The plurality of ink recirculation modules 404A-404C are disposed in the case 314. The plurality of ink recirculation modules 404A-404C are disposed above the plurality of printheads 402A-402C.

Each ink recirculation module 404A-404C is fluidly coupled to one of the plurality of printheads 402A-402C. The plurality of ink recirculation modules 404A-404C are operable to circulate the inkjet material such that the inkjet material continuously flows through the processing apparatus 304. The continuous flow of the inkjet material improves the deposition of the inkjet material during the inkjet printing process by reducing inkjet material settlement and clogging in the processing apparatus 304. The processing apparatus 304 further includes at least one alignment camera 406. The alignment camera 406 is disposed in the case 314. The alignment camera 406 is operable to align the substrate within the inkjet printer 200 (shown in FIG. 2).

Figure 5:
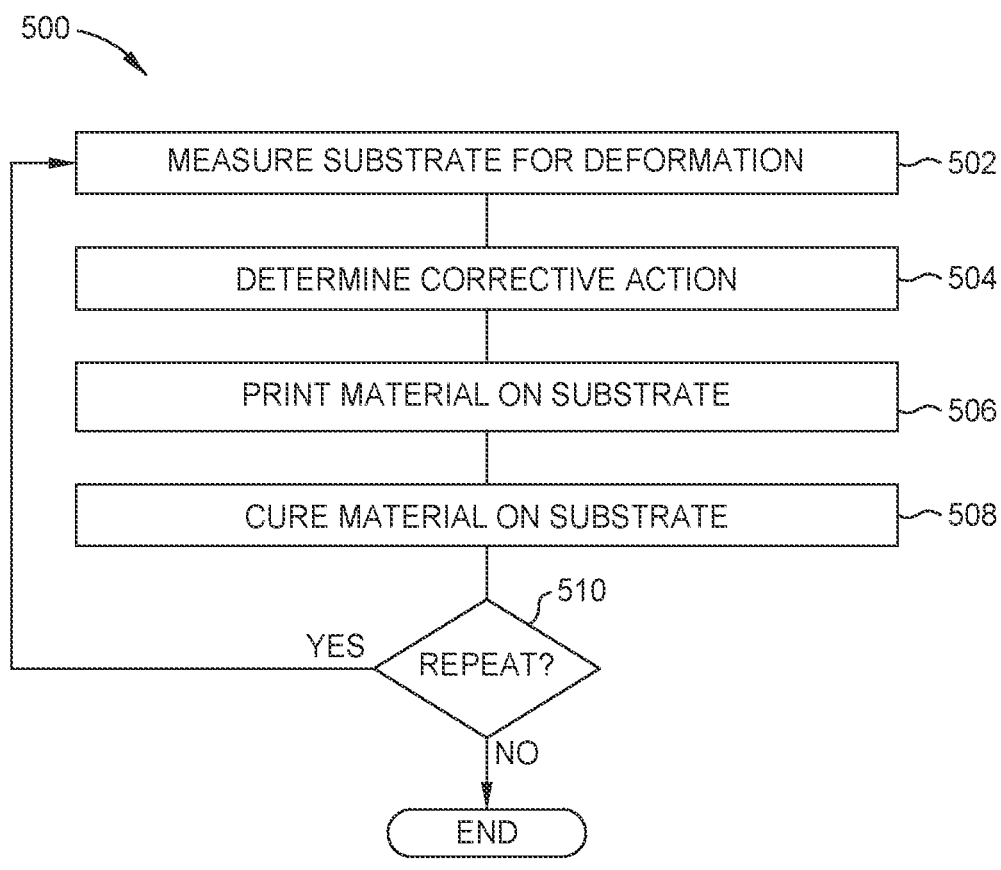
FIG. 5 is a flow diagram of a method of correcting deformation on a substrate, according to one embodiment of the disclosure.

FIG. 5 is a flow diagram of a method 500 of correcting deformation on a substrate, according to one embodiment of the disclosure. Method 500 begins at operation 502. In operation 502, a substrate is measured in a metrology module to determine deformation of the substrate. The module may include a microscope or other viewing/measuring apparatus. The deformation may include bending, warping, or other non-planar orientation of the substrate. While examples herein illustrate the metrology module being located on the same platform as an inkjet printer, it is contemplated that measurement of deformation may occur remote from the inkjet printer.

Data indicating deformation is transferred to a controller, such as controller 199 in FIG. 1. The data may be provide in the form of a chart, table, two-dimensional map, three-dimensional map, or in another manner. The data indicates locations and extent of deformation (warpage and/or bowing) of the substrate.

In operation 504, the controller 199, 310 determines a corrective action to be taken to the remove or reduce the measured deformation. In one example, the controller 199, 310 runs a software routine which, based on data received in operation 502, identifies areas of the substrate to be physically adjusted to bring the substrate within a predetermined range of a physical shape. The software routine identifies area(s) on a substrate on which a material is printed via an inkjet printer to facilitate shape adjustment of the substrate. The print areas, the print material, and the amount of printing are determined via one or both of an empirical model or stress/strain modeling software. It is contemplated that these models may be updated or refined throughout processing to improve modeling accuracy. In one example, the models may be updated through the use of machine learning algorithms, thus minimizing user workload and improving processing results. The machine learning algorithms may employ supervised learning or unsupervised learning techniques. Examples of machine learning algorithms embodied by the program include, but are not limited to, linear regression, logistic regression, decision tree, state vector machine, neural network, naïve Bayes, k-nearest neighbors, K-Means, random forest, dimensionality reduction algorithms, and gradient boosting algorithms, among others. In one example, the machine learning algorithm is utilized to modulate print area, print material, or print thickness.

In operation 506, the controller 199, 310 sends instructions to an inkjet printer to print one or more materials onto a surface of a substrate while the substrate is positioned in the inkjet printer. The one or more materials are then printed onto a surface of the substrate in an amount, location, and composition as determined in operation 504. In one example, the printed material includes sol-gel and/or an acrylate. Optionally, a primer material may be printed prior to the sol-gel or the acrylate to facilitate adhesion between the substrate and the sol-gel/acrylate.

In operation 508, the material printed during operation 506 is cured. During curing, the printed materials polymerize. The polymerization results in densification of the printed film, and to some extent, shrinkage of the film in a plane of film. The shrinkage adjusts the modulus in a location where the film is printed by inducing bending (in a counter-direction of the measured bend from operation 502) upon curing, to facilitate reduction of undesired deformation. In one example, the curing is an ultraviolet (UV) cure, although thermal cures are also contemplated. The UV dose in the case of UV curing, or the temperature in the case of thermal curing, may be selected depending upon the composition/amount of printed material. In addition, cure time may also be adjusted to provide a predetermined amount of curing of the printed material.

The use of an inkjet printer enables localized deformations to correct, by printing an inkjet material at a particular deformation location (which may be less than the entire substrate surface). In contrast, conventional techniques to reduce bowing, such as by applying a film using CVD or PVD, coat an entire surface of the substrate, and therefore, do not allow for localized corrections. Planarity of the substrate may be maintained by printing a material with less shrinkage in areas where deformation correction is unneeded. Thus, when cured, minimal or no shrinkage would occur in such areas, and thus, the substrate contour would not be affected at these locations, but rather, only in locations where the inkjet printer prints "shrinking" material. In such a context, the film printed on the substrate would have multiple compositions, with at least two of the compositions having different degrees of shrinkage.

Optionally, in operation 510, operations 502-508 may be repeated as needed to facilitate deformation removal. In such an example, previously printed/cured materials may be planarized so that non-planarity of the cured film isn't mistaken for deformation of the substrate. In addition, it is contemplated that corrective action determined during operation 504 accounts for previously deposited/cured films.

Figures 6, 7:
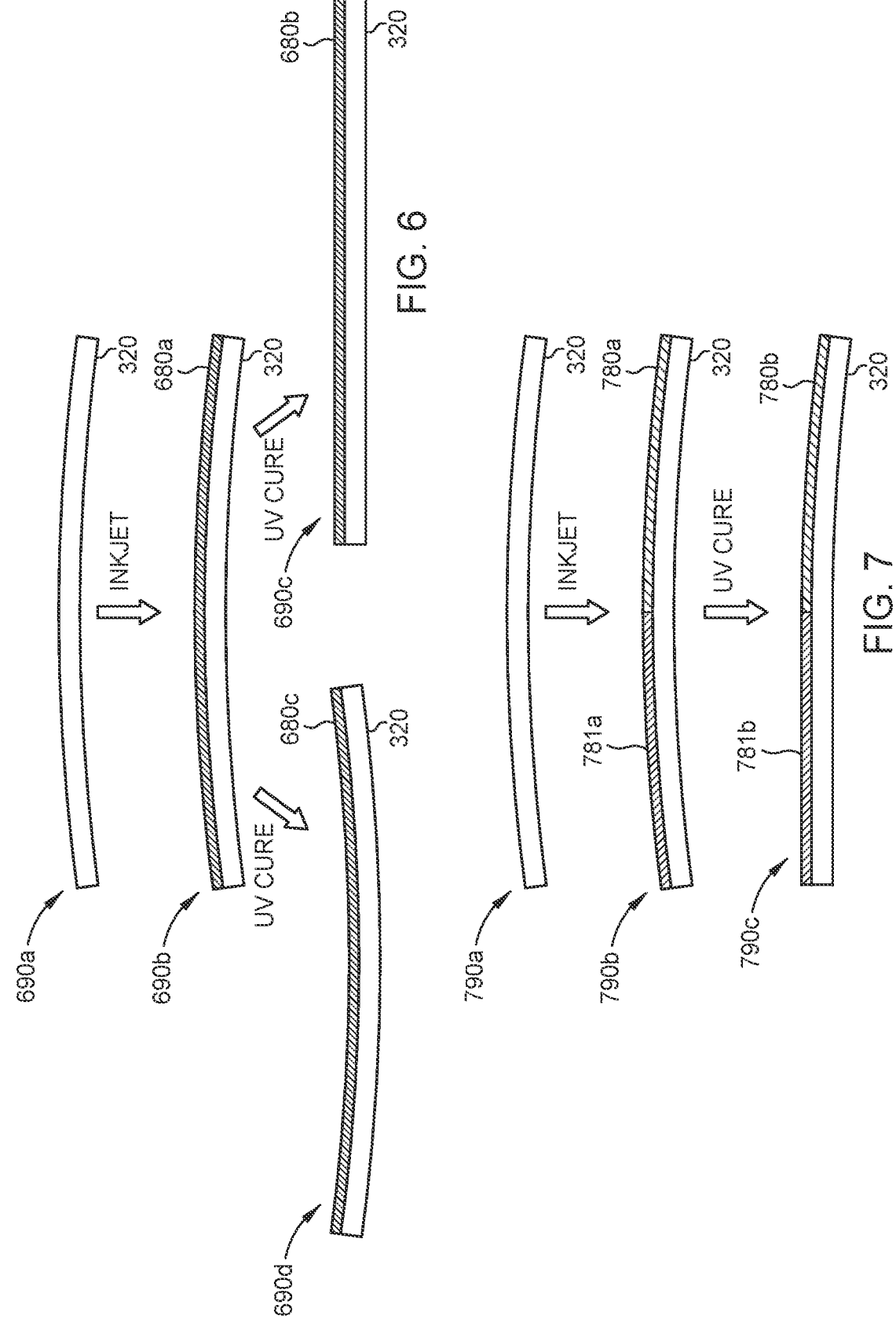
FIG. 6 illustrates correction of substrate deformation, according to one embodiment of the disclosure.
FIG. 7 illustrates correction of substrate deformation, according to another embodiment of the disclosure.

FIG. 6 illustrates correction of substrate deformation, according to one embodiment of the disclosure. For example, as shown in configuration 690a, a substrate 320 has a deformation (illustrated as a convex curve). The particular deformation, and the extent thereof, is determined by a metrology module as discussed above.

In configuration 690b, the substrate 320 has a film 680a printed thereon with an inkjet printer. The composition, thickness, and placement of the film 680a is determined by a software model, such as an empirically-derived model, and is selected to reshape the substrate 320 such that the substrate 320 is within tolerances of a desired shape. As shown in configuration 690b, the film 680a is a single-composition film and is printed on the entirety of the upper surface of the substrate 320.

Configuration 690c illustrates the substrate 320 after curing. Upon curing, the film 680a becomes a cured film 680b. Polymerization of molecules in the film 680a during curing results in the shrinkage (e.g., contraction) and/or densification, such that the cured film 680b has sufficient modulus to induce counter-deformation, resulting in a predetermined shape of the substrate 320.

As an alternative to configuration 690c, it is contemplated that configuration 690d may be selectively achieved. In configuration 690d, a counter-deformation is induced to a sufficient degree such that a resulting desired bow (or other shape) is present after curing. Such a configuration is achieved by appropriate selection of the film 680a. Configuration 690d is particularly beneficial when non-planar configurations are desired, or when it is expected that downstream operations on the substrate 320 will induce deformation which will be balanced by the deformation achieved in configuration 690d.

FIG. 7 illustrates correction of substrate deformation, according to another embodiment of the disclosure. The correction of substrate deformation in FIG. 7 is similar to as shown in FIG. 6, however, FIG. 7 illustrates localized corrections. Due to the use of inkjet printing as disclosed herein, localized corrections are achievable, which are not otherwise possible with conventional techniques.

As shown in configuration 790a, a substrate 320 has a deformation (illustrated as a convex curve). The particular deformation, and the extent thereof, is determined by a metrology module as discussed above. A difference between the measured deformation and desired shape is determined by a controller 199, 310 or other computer, and type, amount, and placement of one or more films to be printed on the substrate 320 to change the substrate shape, is selected according to empirical or modeled data.

In configuration 790b, the substrate 320 as a first film 780a and a second film 781a printed thereon with one or more inkjet printers. The composition, thickness, and placement of the films 780a, 781a is determined by a software model, such as an empirically-derived model, and is selected to reshape the substrate 320 such that the substrate 320 is within tolerances of a desired shape. As shown in configuration 790b, the films 780a, 781a, combined, are printed on the entirety of the upper surface of the substrate 320. In this example, each of the films 780a, 781a are different in composition, such that each film 780a, 781a induces a different amount of curvature (due to different amounts of shrinkage) onto the substrate 320 upon curing.

Configuration 790c illustrates the substrate 320 after curing. Upon curing, the films 780a, 781a become cured films 780b, 781b. Polymerization of molecules in the films 780b, 781b during curing results in the shrinkage (e.g., contraction) and/or densification, such that the cured films 780b, 781b have sufficient modulus to induce counter-deformation, resulting in a predetermined shape of the substrate 320. In one example, the cured film 781b has a modulus within a range of 1000 MPa to 10 GPa, and induces more bending into the substrate 320 than the cured film 780b, which has a modulus less than 20 MPa. Thus, as illustrated, inkjet printing can be used to induce more or less localized deformation correction in selected areas of a substrate 320. Additionally, it is to be noted that while configuration 790c does not illustrate a planar substrate 320, it is contemplated that the placement and composition of films 780a, 781a may be selected to produce a substantially planar substrate 320 after curing.

Figure 8:
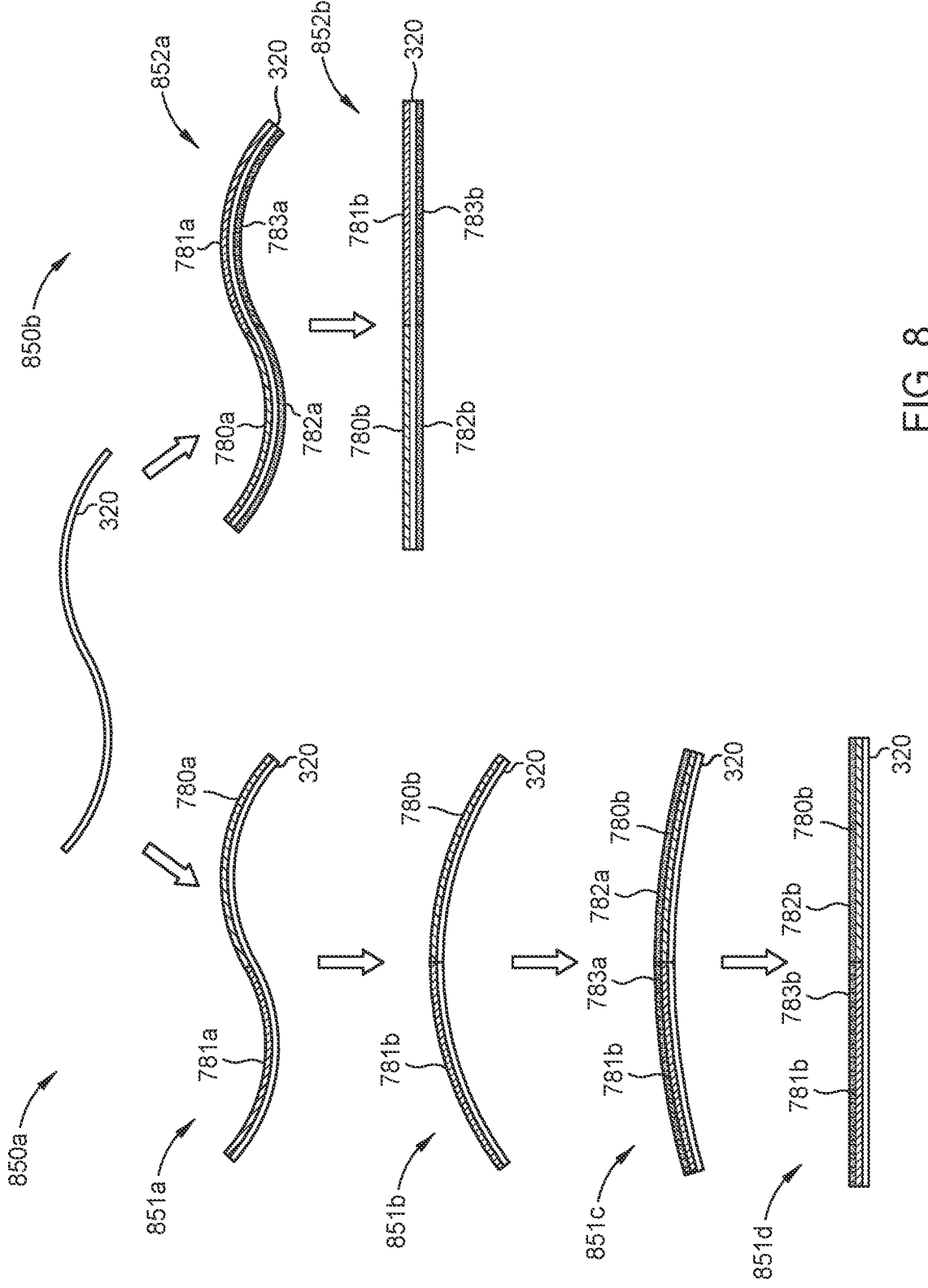
FIG. 8 illustrates correction of substrate deformation, according to another embodiment of the disclosure.

FIG. 8 illustrates correction of substrate deformation, according to another embodiment of the disclosure. FIG. 8 illustrate a first process flow 850a and a second, alternative process flow 850b. In process flow 850a, a substrate 320 is provided with a deformation. In configuration 851a of process flow 850a, a plurality of films 780a, 781a (two are shown) are printed on an upper surface of the substrate 320. The location and composition of the films 780a, 781a, is determined as discussed above. While the films 780a, 781a are shown as covering an approximately 50:50 ratio of the upper surface of the substrate 320, other ratios are also contemplated. In one example, the films 780a, 781a are printed to have approximately the same thickness. However, is contemplated that post processing (such as etching or polishing) may be performed to equalize the thicknesses of the films 780a, 781a.

In configuration 851b, the films 780a, 781a are cured forming films 780b, 781b, inducing bending upon the substrate 320. Since the composition is different for each of the films 780a, 781a, localized bending of the substrate is induced according to the respective placement of each of films 780a, 781a.

In configuration 851c, third and fourth films 782a, 783a are printed on printed over cured films 780b, 781b. Subsequently, in configuration 851d, the third and fourth films 782a, 783a are cured to form films 782b, 783b, inducing a desired bending into substrate 320.

It is to be noted that the curing of films 780a, 781a, 782a, and 783a may occur simultaneously, and thus, films 782a, 783a would be printed upon uncured films. In addition, it is to be noted that the films 782a, and 783a, when printed, may not align with the films 780a and 781a. Rather, placement of films 782a, 783a is determined according to metrology and algorithms described herein. Finally, it is to be noted that composition of films 782a, 783a may be the same or different than the composition of films 780a, 781a.

In an alternative process flow 850b, configuration 852a, films 780a, 781a are printed on a first side of substrate 320, while films 782a, 783a are printed on a second, opposite side of the substrate 320. Subsequently, as shown in configuration 852b, the films 780a, 781a, 782a, and 783a are cured forming cured films 780b, 781b, 782b, and 783b, resulting in at least partial correction of substrate deformation.

Figure 9:
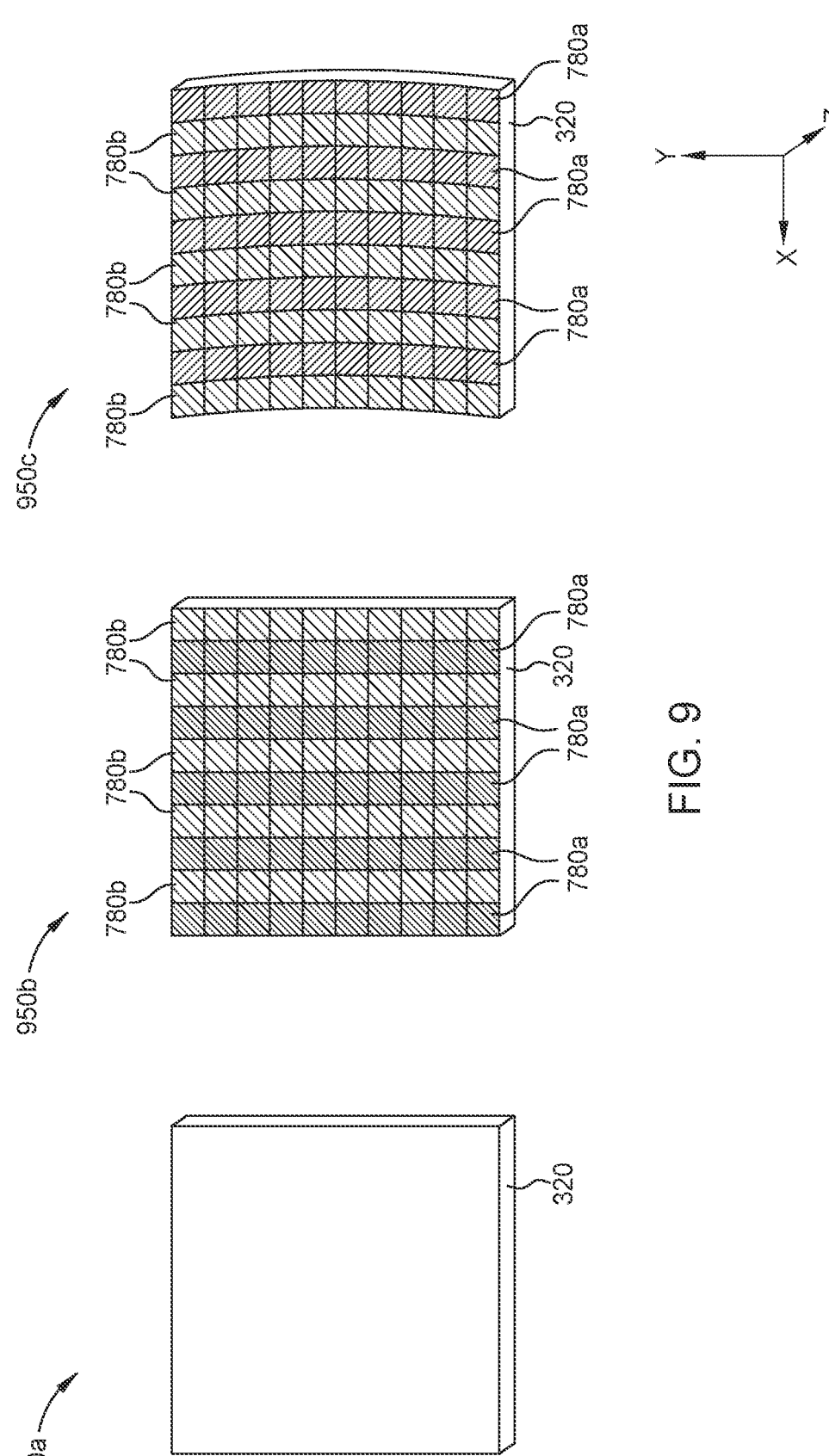
FIG. 9 illustrates correction of substrate deformation, according to another embodiment of the disclosure.

FIG. 9 illustrates correction of substrate deformation, according to another embodiment of the disclosure. FIG. 9 illustrates a substrate 320 in a configuration 950a. Subsequent to an inkjet printing process, the substrate 320 includes films 780a, 781a printed on an upper surface thereof, as shown in configuration 950b. The films 780a, 781a are printed in alternating columns, parallel in a Y-direction. After curing the films 780a, 781a to form cured films 780b, 781b, the substrate deforms (e.g., bends) in a single direction. For example, the substrate contracts along the Y axis, but not the Z axis. The single direction banding is facilitated by the alternating bands of films of different composition. Conventional techniques are incapable of one dimensional bending. However, because the present disclosure utilizes inkjet printing which facilitates localized corrections, one dimensional corrections are possible.

Figure 10:
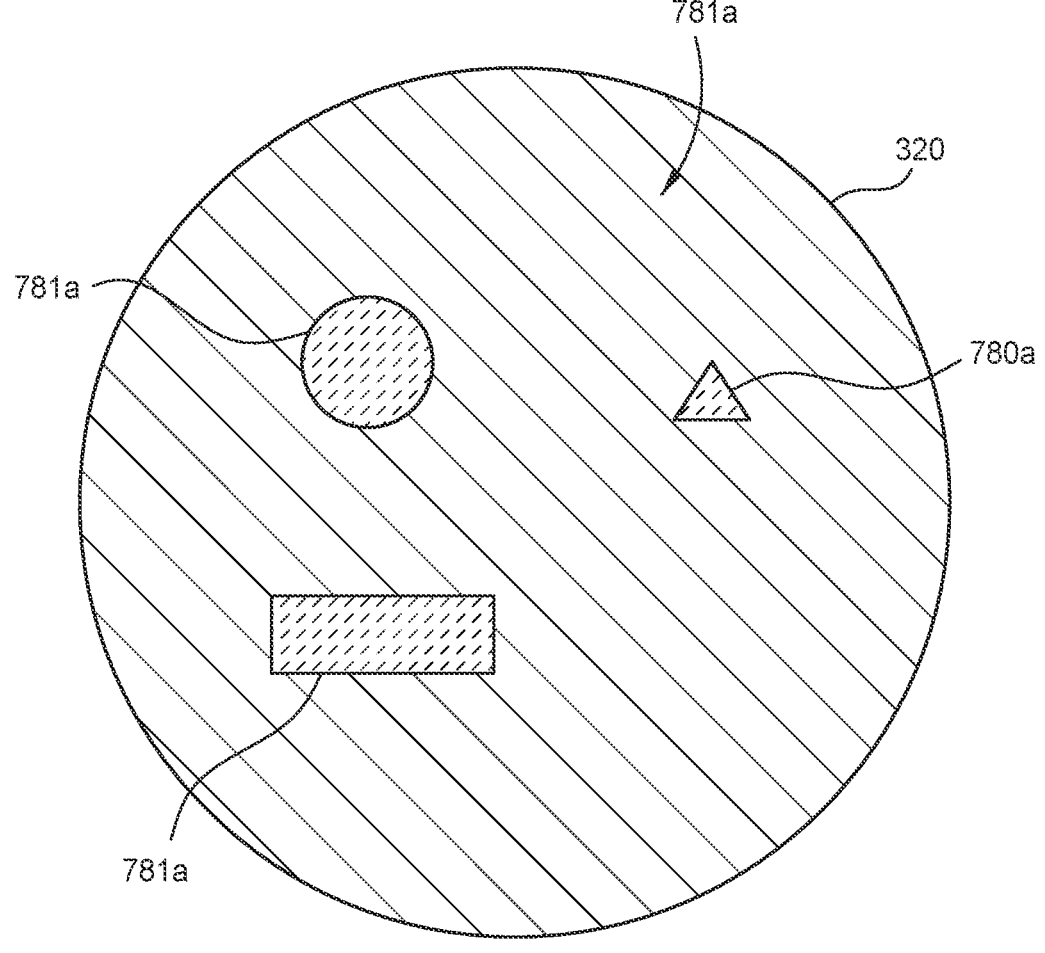
FIG. 10 illustrates a plan view of a substrate, according to one embodiment of the disclosure.

FIG. 10 illustrates a plan view of a substrate 320, according to one embodiment of the disclosure. As shown in FIG. 10, the substrate 320 includes multiple regions on an upper surface thereon, having a first film 780a printed. The remaining regions on the upper surface of the substrate 320 have a second film 781a printed thereon. Thus, the entirety of the upper surface of the substrate 320 is covered in a film to facilitate planarity. Planar surfaces improve optical device performance when the substrate 320 is a component of an optical device.

While the regions in which film 781a is printed are geometric shapes, it is to be noted that other shapes and other locations are contemplated. The illustrated regions in which film 781a is printed are only to facilitate explanation.

In some aspects, it is contemplated that printed materials may include one or more monomers, crosslinkers and/or photoinitiators.

Examples of suitable mono-functional monomers include, but are not limited to, tetrahydrofurfuryl acrylate (e.g., SR285 from Sartomer®), tetrahydrofurfuryl methacrylate, vinyl caprolactam, isobornyl acrylate ("IBOA"), isobornyl methacrylate, 2-phenoxyethyl acrylate, 2-phenoxyethyl methacrylate, 2-(2-ethoxyethoxy)ethyl acrylate, isooctyl acrylate, isodecyl acrylate, isodecyl methacrylate, lauryl acrylate, lauryl methacrylate, stearyl acrylate, stearyl methacrylate, cyclic trimethylolpropane formal acrylate, 2-[[(Butylamino) carbonyl]oxy]ethyl acrylate (e.g., Genomer 1122 from RAHN USA Corporation) 3,3,5-trimethyl-cyclohexane acrylate, and mono-functional methoxylated PEG (350) acrylate, etc.

Examples of suitable crosslinkers include, but not are limited to, diacrylates or dimethacrylates of diols and polyether diols, such as propoxylated neopentyl glycol diacrylate, 1,6-hexanediol diacrylate, 1,6-hexanediol dimethacrylate, 1,3-butylene glycol diacrylate, 1,3-butylene glycol dimethacrylate, 1,3-butanediol diacrylate, 1,4-butanediol diacrylate, 1,4-butanediol dimethacrylate, dicyclopentenyl acrylate (e.g., FA-513A from Hitachi Chemical), dicyclopentenyl methacrylate (e.g., FA-513M from Hitachi Chemical), 3,3,5-trimethyl cyclohexyl acrylate (e.g., SR420 from Sartomer®), alkoxylated aliphatic diacrylate (e.g., SR9209A from Sartomer®), diethylene glycol diacrylate, diethylene glycol dimethacrylate, dipropylene glycol diacrylate (e.g., SR508 from Sartomer®), tetrahydrofurfuryl acrylate (e.g., SR285 from Sartomer®), 1,4-butanediylbis [oxy (2-hydroxy-3,1-propanediyl)]bisacrylate, polyether modified polydimethylsiloxane, tripropylene glycol diacrylate, triethylene glycol dimethacrylate, and alkoxylated hexanediol diacrylates, e.g. SR562, SR563, SR564 from Sartomer®.

Examples of suitable photoinitiators include, but are not limited to, 1-hydroxycyclohexylphenyl ketone, 4-isopropylphenyl-2-hydroxy-2-methyl propan-1-one, 1-[4-(2-hydroxyethoxy)-phenyl]-2-hydroxy-2-methyl-1-propan-1-one, 2,2-dimethyl-2-hydroxy-acetophenone, 2,2-dimethoxy-2-phenylacetophenone, 2-hydroxy-2-methylpropionphenone, diphenyl(2,4,6-trimethylbenzoyl) phosphine oxide, bis(2,6-dimethoxy-benzoyl)-2,4,6 trimethyl phenyl phosphine oxide, 2-methyl-1-1 [4-(methylthio) phenyl]-2-morpholino-propan-1-one, 3,6-bis(2-methyl-2-morpholino-propionyl)-9-n-octylcarbazole, 2-benzyl-2-(dimethylamino)-1-(4-morpholinyl)phenyl)-1-butanone, benzophenone, 2,4,6-trimethylbenzophenone, isopropyl thioxanthone, phenylbis(2,4,6-trimethylbenzoyl) phosphine oxide, 2-hydroxy-2-methyl-1phenyl-1-propanone. Suitable blends of photoinitiators commercially available include, but are not limited to, those under the designations of Darocur 4265, Irgacure 819, Irgacure 1173, Irgacure 2022, Irgacure 2100 from Ciba® Specialty Chemicals; and Esacure KT37, Esacure KT55, Esacure KTO046 from Lamberti®). The photoinitiator could be from BASF, such as Irgacure series 184, 2022, 2100, 250, 270, 295, 369, 379, 500, 651, TPO, TPO-L, 754, 784, 819, 907, 1173, or 4265. The amine synergist can be of secondary or tertiary amino compounds with or without acrylic groups. Examples of these items include diethanolamine, triethanolamine or Genomer 5142.

It is contemplated that other materials may additionally or alternatively be printed depending on process requirements.

While the foregoing is directed to embodiments of the present disclosure, other and further embodiments of the disclosure may be devised without departing from the basic scope thereof, and the scope thereof is determined by the claims that follow.

What is claimed is:

1. A method of curing a deformation in an optical device substrate, comprising:

printing a first film on a first area of an optical device of the optical device substrate via inkjet printing, the optical device substrate having a diameter, the first film being a material that polymerizes and contracts when cured;

printing a second film on a second area of the optical device of the optical device substrate via inkjet printing, the second film being a material that polymerizes and contracts when cured; and curing the first film and the second film to induce a bend in the optical device substrate.

2. The method of claim 1, wherein the first film and the second film have different chemical compositions.

3. The method of claim 1, wherein the first film and the second film comprise acrylates.

4. The method of claim 1, wherein the first film is printed in localized areas of the optical device, and the second film is printed on remaining areas of the optical device.

5. The method of claim 1, wherein the curing is an ultraviolet cure.

6. The method of claim 1, wherein the curing is a thermal cure.

7. The method of claim 1, wherein the first film induces a greater bend in the optical device substrate than the second film after the curing.

8. The method of claim 1, wherein the first area and the second area are alternating, parallel columns.

9. The method of claim 1, wherein the first film and the second film comprise monomers, crosslinkers, or photoinitiators.

10. The method of claim 1, wherein the first film has a larger modulus than the second film after the curing.

11. The method of claim 1, further comprising identifying one or more areas on the optical device substrate with deformation.

12. A method of curing a deformation in an optical device substrate, comprising:

measuring the optical device substrate for deformation;

printing a first film on a first area of an optical device of the optical device substrate via inkjet printing, the first film being a material that polymerizes and contracts when cured;

printing a second film on a second area of the optical device of the optical device substrate via inkjet printing, the second film being a material that polymerizes and contracts when cured; and curing the first film and the second film to induce a bend in the optical device substrate.

13. The method of claim 12, wherein the first film and the second film have different chemical compositions.

14. A method of curing a deformation in an optical device substrate, comprising:

identifying one or more areas on an optical device of the optical device substrate with deformation;

printing a first film over a first area of the optical device of the optical device substrate via inkjet printing, the first film being a material that polymerizes and contracts when cured;

printing a second film over a second area of the optical device of the optical device substrate via inkjet printing, the second film being a material that polymerizes and contracts when cured;

printing a third film over a third area of the optical device of the optical device substrate via inkjet printing, the third film being a material that polymerizes and contracts when cured;

printing a fourth film over a fourth area of the optical device of the optical device substrate via inkjet printing, the fourth film being a material that polymerizes and contracts when cured; and curing of the first film, the second film, the third film, and the fourth film to induce a bend in the optical device substrate.

15. The method of claim 14, wherein the first film and the second film have different chemical compositions; and the third film and the fourth film have different chemical compositions.

16. The method of claim 14, wherein the first film, the second film, the third film, and the fourth film have different chemical compositions.

17. The method of claim 14, further comprising a first curing of the first film and the second film to induce a bend in the optical device substrate prior to the printing the third film and the printing the fourth film.

18. The method of claim 14, wherein the third area is adjacent the first area, and the fourth area is adjacent the second area.

19. The method of claim 14, wherein the first film and the second film are printed on a first surface of the optical device substrate, and the third film and the fourth film are printed on a second surface of the optical device substrate.

20. The method of claim 14, wherein the first film, the second film, the third film, and the fourth film are printed on a first surface of the optical device substrate.

21. The method of claim 1, wherein the diameter of the optical device substrate is from about 100 mm to about 750 mm.

22. The method of claim 1, wherein the optical device of the optical device substrate is a waveguide combiner.

23. The method of claim 1, wherein the optical device of the optical device substrate is a micro-lens array.

24. The method of claim 1, wherein the optical device of the optical device substrate is a flat optical device.

25. The method of claim 1, wherein the optical device substrate comprises silicon (Si), silicon nitride (SiN), silicon dioxide (SiO$_2$), fused silica, quartz, silicon carbide (SiC), germanium (Ge), silicon germanium (SiGe), indium phosphide (InP), gallium arsenide (GaAs), gallium oxide (GaO), diamond, lithium niobate (LiNbO$_3$), gallium nitride (GaN), sapphire, tantalum oxide (Ta$_2$O$_5$), titanium dioxide (TiO$_2$), or combinations thereof.

\*   \*   \*   \*   \*